(No Model.)
P. COSTA.
FISHING BOAT ATTACHMENT.
No. 456,720. Patented July 28, 1891.
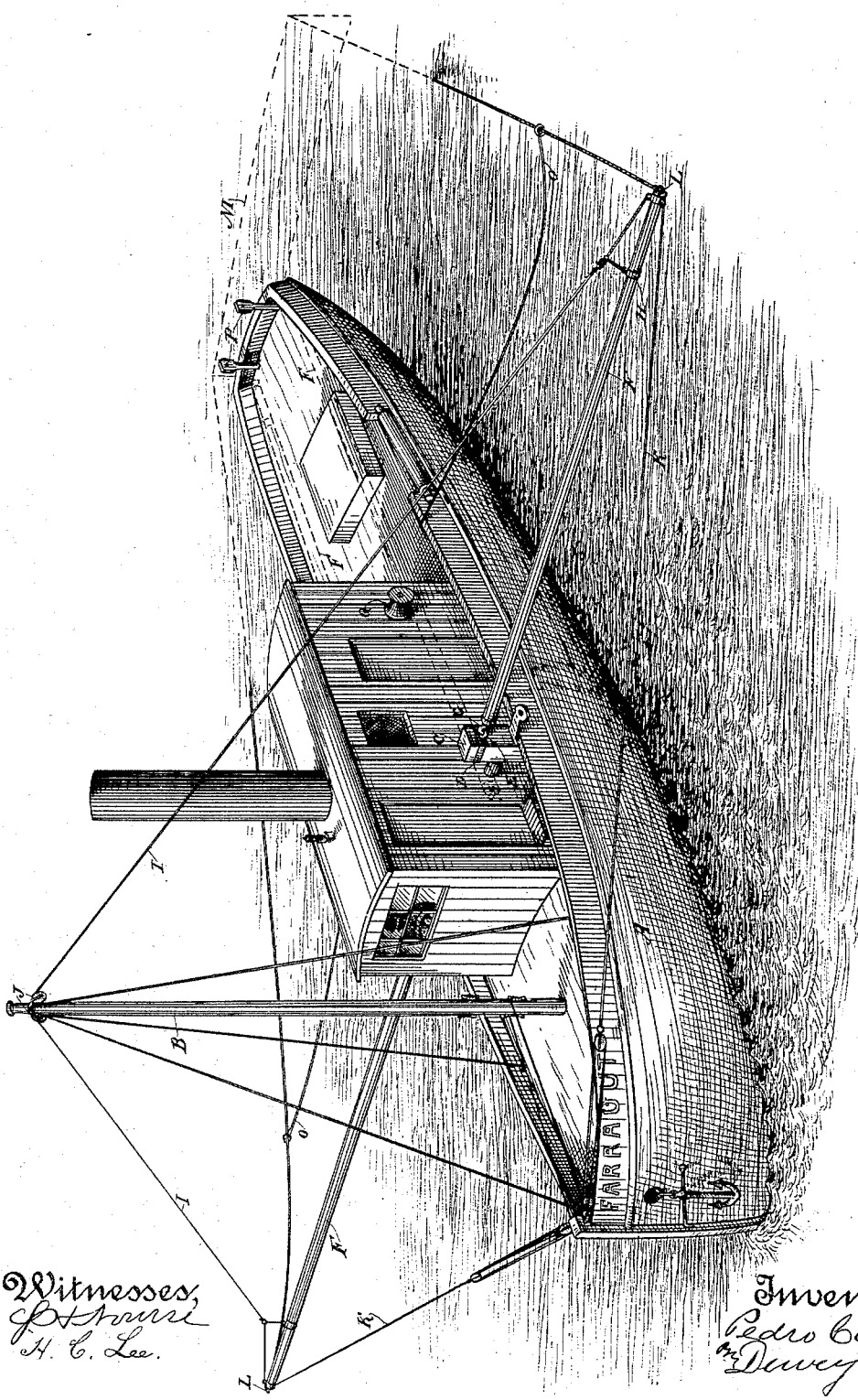

UNITED STATES PATENT OFFICE.

PEDRO COSTA, OF SAN FRANCISCO, CALIFORNIA.

FISHING-BOAT ATTACHMENT.

SPECIFICATION forming part of Letters Patent No. 456,720, dated July 28, 1891.

Application filed December 1, 1890. Serial No. 373,236. (No model.)

*To all whom it may concern:*

Be it known that I, PEDRO COSTA, a citizen of the United States, residing in the city and county of San Francisco, State of California, have invented an Improvement in Fishing-Boat Attachments; and I hereby declare the following to be a full, clear, and exact description of the same.

My invention relates to an attachment which is designed for use with fishing-boats.

It consists of booms adapted to project from opposite sides of the vessel, means for attaching said booms and retaining them in place, and means for attaching the ropes of a net, so that the latter may be kept open while towing behind the vessel, and in certain details of construction.

Referring to the accompanying drawing for a more complete explanation of my invention, the figure is a view of my boat with its attachment.

A is the boat, having a mast B. Upon each side of this boat is fixed the short vertical post C, having an iron band D fitted around its upper end. This band has upon the outer side nearest the rail of the vessel a staple or eye E.

F is a boom of any suitable or desired length. Usually these booms are made about fifty feet in length. Upon the inner end of each boom is fixed a hook G, which is adapted to fit into the staple E upon the post. Near the outer end of each boom is fixed a band and an eye H, and from these eyes the suspending-stays I extend up to the mast, where they pass over blocks J and lead thence down to the deck of the vessel, so that by means of these stays the outer ends of the boom may be raised or lowered at will.

K are stays extending from the outer ends of the booms to the bow of the vessel, where they are suitably secured, and by means of these stays the booms are prevented from swinging backward when the vessel moves forward. Upon the outer end of each of the booms are fixed the eyes L, and to these eyes the lines from the ends of the net are attached.

M represents the net, to the ends of which the rear ends of the lines are connected, the lines being about one hundred and twenty fathoms in length, and by reason of the distance between the outer ends of the booms the net which is towed behind the vessel will be kept open, so as to gather any fish which may be encountered.

The vessel may be propelled by sails, oars, or steam. I have shown my device as applied to a steam-propelled vessel, so that the net may be towed through the water at any desired rate of speed and to any distance.

When it is desired to bring the net aboard, the lines O are employed. These lines have rings upon the outer end, which clasp the tow-ropes of the net, and by hauling in on these lines O the tow-ropes are brought into line with the stern of the vessel, where they are passed over the guiding sheaves or chocks at P and are led forward to the winding-drums Q. By these drums the net is drawn up close to the vessel, and it may then be hauled aboard and its contents discharged into the hold.

Having thus described my invention, what I claim as new, and desire to secure by Letters Patent, is—

A vessel having vertical stanchions C upon each side, provided with metallic bands fitting their upper ends and having staples or eyes E, booms having hooks on their inner ends adapted to fit said eyes, stays by which the booms are held in a horizontal position projecting from the sides of the vessel, ropes extending from the outer ends of the booms and connecting with a net adapted to be towed behind the vessel, the lines O, having rings adapted to clasp the tow-lines, the guiding sheaves or chocks P at the stern of the vessel, and the winding-drums forward of the sheaves, substantially as herein described.

In witness whereof I have hereunto set my hand.

PEDRO COSTA.

Witnesses:
S. H. NOURSE,
H. C. LEE.